United States Patent Office 3,558,309
Patented Jan. 26, 1971

3,558,309

PHOTOPOLYMERISATION OF ETHYLENICALLY UNSATURATED ORGANIC COMPOUNDS

Urbain Leopold Laridon, Wilrijk, and Gérard Albert Delzenne, Sur- Gravenwezel, Belgium, assignors to Gevaert-Agfa N.V., Mortsel, Belgium, a Belgian company No Drawing. Filed July 11, 1968, Ser. No. 743,948
Claims priority, application Great Britain, Aug. 8, 1967, 36,394/67
Int. Cl. G03c *1/68*
U.S. Cl. 96—35.1 18 Claims

ABSTRACT OF THE DISCLOSURE

Photopolymerisation of ethylenically unsaturated organic compounds using compounds containing an oxime ester group as an initiator.

The present invention relates to the photopolymerisation of ethylenically unsaturated organic compounds and to polymers obtained therefrom.

The photopolymerisation of ethylenically unsaturated organic compounds can be initiated by exposure to high intensity radiation such as ultraviolet rays. Methyl acrylate, for instance, on long standing in sunlight is transformed into a transparent mass (cf. Ellis: The Chemistry of Synthetic Resins, vol. II (1935), page 1072). Polymerisation, however, by the use of light alone, proceeds at a much slower rate when compared to polymerisation brought about by a free radical-generating catalyst or by heat. Moreover, the use of light alone, unaided by other agents, requires very long exposure times in order to polymerise the monomer sufficiently. Furthermore, the low rate of polymerisation necessitates the use of extremely intense radiations such as those obtained from high intensity carbon arcs.

A lot of photopolymerisation initiators, which under the influence of actinic light increase the photopolymerisation rate, have already been described. A survey of such photopolymerisation initiators has been given by G. Delzenne in Industrie Chimique Belge, 24 (1959), 739–764.

According to the present invention a process is provided for the photopolymerisation of ethylenically unsaturated organic compounds, which process comprises irradiating with light of wavelengths ranging from 2500 to 4000 angstroms a composition comprising a photopolymerisable ethylenically unsaturated organic compound and as a photopolymerisation initiator a compound containing at least one oxime ester group. For facility's sake such compounds containing an oxime ester group will be named "oxime esters" hereinafter.

A first class of oxime esters, which according to the invention can be used as photopolymerisation initiators, are the compounds corresponding to the general formulae:

$$R_2-\overset{R_1}{\overset{|}{C}}=N-O-R_3$$

$$\text{or}\quad R_2-\overset{R_1}{\overset{|}{C}}=N-O-R_4-O-N=\overset{R_1}{\overset{|}{C}}-R_2$$

wherein:

$R_1$ represents an alkyl group comprising 1 or 2 carbon atoms, an aryl group, an alkaryl group, an aralkyl group, a hydroxy-substituted aralkyl group, or an acyl group, including a substituted acyl group, $R_2$ represents a hydrogen atom, an alkyl group comprising 1 or 2 carbon atoms, an aryl group, or an acyl group, or wherein $R_1$ and $R_2$ together represent the necessary atoms to form with the carbon atom a cycloalkyl group, a phenanthrone group, or an indanone group, $R_3$ represents an acyl group including a substituted acyl group, and $R_4$ represents a diacyl group.

These oxime esters are prepared from the oxime obtained by treating diketones in alkaline medium at 0–5° C. with hydroxylamine hydrochloride or by treating ketons with alkyl nitrites in ether solution containing hydrochloric acid. The monoximes thus formed are dissolved in sodium hydroxide, and the oxime esters produced after addition of the appropriate acid chloride are separated.

Suitable oxime esters are listed in the following table.

Compound

1.
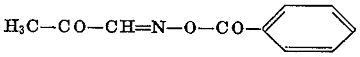

2.
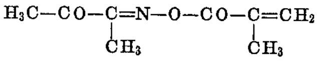

3.
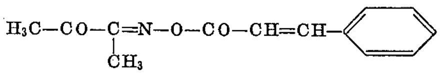

4.
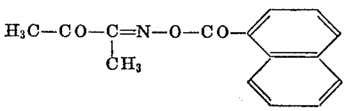

5.
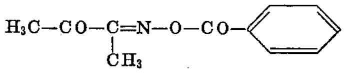

6.
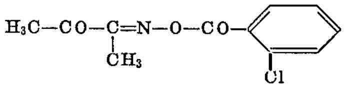

7.
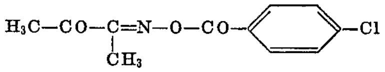

8.
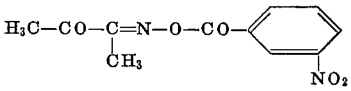

9.
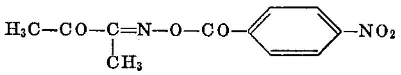

10.
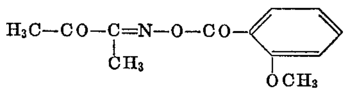

11.
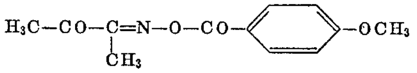

12.
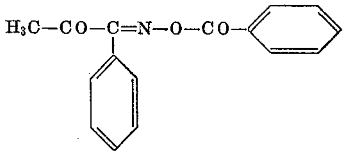

13.
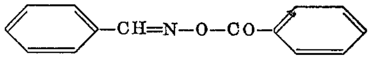

14.
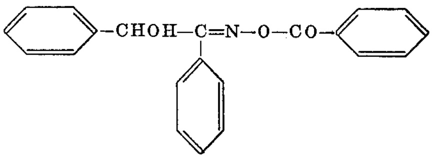

Compound

15. 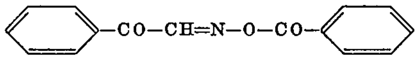

16. 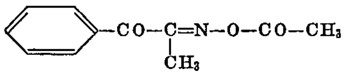

17. 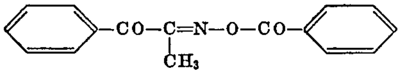

18. 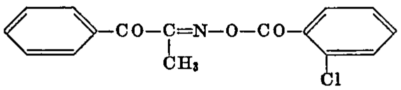

19. 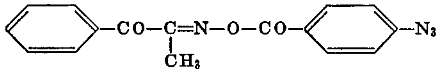

20. 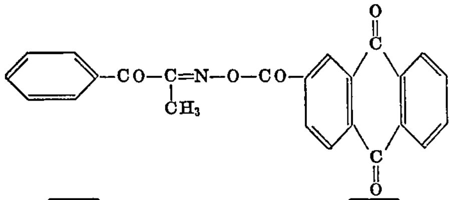

21. 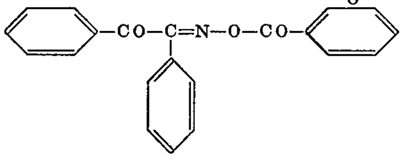

22. 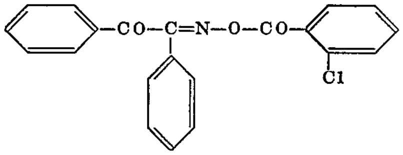

23. 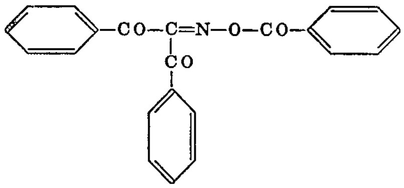

24. 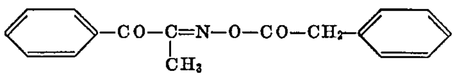

25. 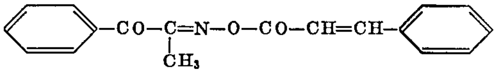

26. 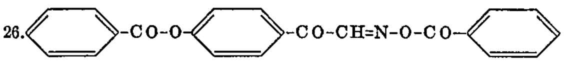

27. 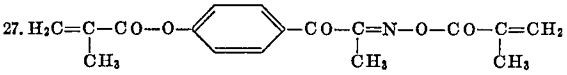

28. 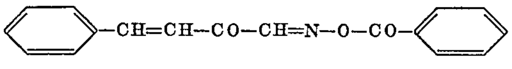

29. 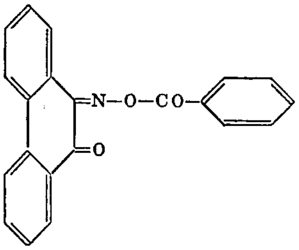

Compound

30. 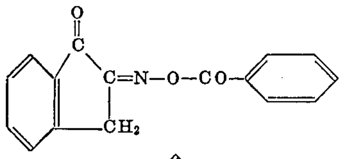

31. 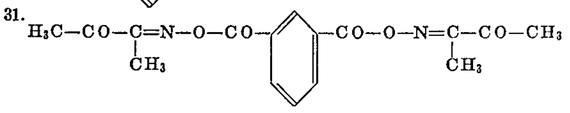

32. 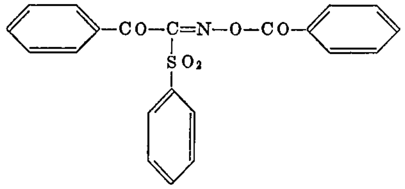

The quantity of oxime ester to be used as photopolymerisation initiator is of course dependent upon many variables including the particular oxime ester used, the wavelength of light employed, the irradiation time, and the monomer of monomers present. Usually the amount of oxine ester is within the range of 0.01 to 5% by weight based on the monomeric material initially present. It is seldom necessary to employ more than 0.2 to 2% by weight to obtain a good polymerisation rate.

The ethlenically unsaturated organic compounds may be exposed to any source of radiation providing wavelengths in the range of 2500–4000 angstroms, preferably in the wavelength region of 3000–4000 angstroms. With certain oxime esters having a higher absorption maximum even radiations of wavelengths above 5000 angstroms may be used. Suitable light sources include carbon arcs, mercury vapour lamps, fluorescent lamps, argon glow lamps, photographic flood lamps and tungsten lamps. Moreover, ordinary daylight may also be used.

The photopolymerisation can be carried out according to any of the well-known processes, such as bulk, emulsion, suspension and solution polymerisation processes. In all of these processes, the addition of an oxime ester according to the invention to polymerisable materials subjected to the action of actinic light greatly increases the rate of photopolymerisation.

A base or support may be coated with a solution of the ethylenically unsaturated organic compound in a solvent therefor, this solution containing in dissolved state or homogeneously dispersed therein a photopolymerisation-initiating oxime ester, whereupon the solvent or solvent mixture is eliminated by known means such as evaporation, leaving a more or less thin coating of the ethylenically unsaturated organic compound on the base or support. Thereafter the dried photopolymerisable coating is exposed to actinic light rays.

When exposing the photopolymerisable composition to actinic light rays the polymerisation does not start immediately. Only after a short period, which among others depends on the ethylenically unsaturated organic composition, the photopolymerisation initiator, and the light intensity used, the photopolymerisation starts. The period necessary for obtaining a perceptible amount of polymerisation is a measure of the efficiency of the photopolymerisation initiator, and is named the inhibition period.

In some circumstances it may be desirable that the photopolymerisable composition comprises a hydrophilic or hydrophobic colloid as carrier or binding agent for the ethylenically unsaturated organic compound and the photopolymerisation initiating oxime ester. By the presence of this binding agent the properties of the light-sensitive layer are of course highly influenced. The choice of the binding agent is dependent on its solubility in solvents, which can also be used as solvents for the ethylenically unsaturated organic compunds and for the oxime ester of the invention. Such binding agents are, e.g., polystyrene, polymethyl methacrylate, polyvinyl acetate, polyvinylbutyral, partially saponified cellulose acetate and other polymers that are soluble in solvents for initiators and monomers. In some circumstances water-soluble polymers can be used such as gelatin, casein, starch, carboxymethylcellulose, and polyvinyl alcohol. The ratio of photopolymerisable composition to binding agent obviously also influences the photopolymerisation. The larger this ratio, the higher the photopolymerisation rate generally will be for one and the same ethylenically unsaturated organic compound.

If the photopolymerisable composition is water-soluble, water may be used as solvent for coating the support. On the contrary, if water-insoluble photopolymerisable compositions are used, organic solvents, mixtures of organic solvents, or mixtures of organic solvents and water may be employed.

The process of the invention is applied to the photopolymerisation of compositions comprising ethylenically unsaturated organic compounds. These compositions may comprise one or more ethylenically unsaturated polymerisable compounds such as styrene, acrylamide, methacrylamide, methyl methacrylate, diethylaminoethyl methacrylate, and acrylonitrile. When two of these monomers are used in the same photopolymerisable composition or if they are mixed with other polymerisable compounds, copolymers are formed during the photopolymerisation. It is further presumed that in the case where the photopolymerisable material is used together with a polymeric binding agent, graft copolymers are formed between the polymeric binder and the photopolymerised material.

The photopolymerisable composition may also comprise or consist of unsaturated compounds having more than one carbon-to-carbon double bond, e.g. two terminal vinyl groups, or of a polymeric compound having ethylenic unsaturation. During polymerisation of these compositions usually cross-linking will occur by means of the plurally unsaturated compound. Examples of compounds containing more than one carbon-to-carbon double bond are, e.g. divinylbenzene, diglycol diacrylates, and N,N-alkylene-bis-acrylamides. Examples of polymeric compounds containing ethylenically unsaturation are, e.g., allyl esters of polyacrylic acid, maleic esters of polyvinyl alcohol, polyhydrocarbons still containing carbon-to-carbon double bonds, unsaturated polyesters, cellulose acetomaleates, and allylcellulose.

All the above enumerated oxime esters have relatively low molecular weights. Acording to the invention, however, also polymers comprising oxime ester groups can be used as photopolymerisation initiators. Such polymers can be divided in two classes. The first class is formed by polymers carrying side-substituents comprising an oxime ester group. For instance, when allowing to react methacrylyl chloride in the dark with diacetylmonoxime a polymerisable monomer carrying an oxime ester group is obtained. This monomer can be polymerised or copolymerised in the dark in acetone solution by using azodiisobutyronitrile as catalyst. In order to prevent the oxime ester groups from decomposing the temperature of polymerisation is kept below 60° C.

When such a polymer or copolymer carrying side-substituents comprising an oxime ester group is irradiated, the oxime ester groups are decomposed as is the case of the low molecular weight oxime esters. Free radicals are also formed, which in this case are distributed along the polymer chains. In the presence of ethylenically unsaturated organic compounds capable of undergoing a free radical polymerisation, the above free radicals will initiate the polymerisation of the monomers present. Graft polymers are formed wherein the original polymer carrying side-substituents comprising an oxime ester group constitutes the basic polymer chain.

The second class of polymers comprising oxime ester groups is formed by those polymers wherein the oxime ester groups constitute an integral part of the polymer chains. This is, for instance, the case with polycondensates obtained from p-hydroxyphenyl-glyoxal aldoxime, 2,2-bis (4-hydroxyphenyl)propane, and a mixture of terephthalic and isophthalic acid chlorides. The polycondensation reactions are carried out in the dark.

When such a polymer, the oxime ester groups of which form an integral part of the polymer chains, is irradiated, the oxime ester groups are decomposed and chain scission with formation of free radicals occurs. Accordingly, this decomposition results in a rupture of the polymer chains, whereby smaller fragments are formed. If the irradiation occurs in the presence of ethylenically unsaturated organic compounds, capable of undergoing a free radical polymerisation, the free radicals attached to the ends of the polymer fragments will initiate the polymerisation of the monomers present. As a result, block polymers are formed consisting of fragments of the original polymeric material bound to polymers formed from the monomer or monomers present.

In the photopolymerisation of ethylenically unsaturated compounds with the oxime esters of the invention high temperatures are not required. The exposure, however, to strong light sources at a relatively short distance, brings about a certain heating of the mass to be polymerised, which heating exercises a favourable influence upon the polymerisation rate.

The photopolymerisable compositions which contain oxime esters are useful in the preparation of photographic images.

The products of the invention are useful as adhesives, coating and impregnating agents, safety glass interlayers, etc. When photopolymerisation of the compositions is carried out within a mold, optical articles such as lenses can be obtained.

The present invention also comprises spreading the polymerisable composition upon a surface such as a surface of metal and printing a design thereon photographically by exposure to light through a suitable image pattern. Hereby the light induces polymerisation in the exposed areas of the photopolymerisation composition whereby the polymeric layer is rendered insoluble in the solvent or solvents used for applying the photopolymerisable layer. Thereafter the nonexposed areas are washed away with a solvent for the monomeric material. In this way printing plates and photographic etching resists are manufactured, which can be further used as planographic printing plates, as matrices for printing matter, as screens for silk screen printing, and as photoresists for etching.

The image-wise photopolymerisation can also induce differential softening properties to the layer. This makes possible a reproduction process by material transfer when the image-wise photopolymerised layer is subsequently warmed up and pressed against a receiving sheet, so that the softened areas are transferred to the receiving sheet.

The following examples illustrate the present invention.

EXAMPLE 1

An amount of methyl methacrylate having been freed from its stabilizing agent was dissolved in benzene, whereupon as an initiator $10^{-3}$ mole of 1-phenyl-1,2-propanedione-2-O-benzoyloxime (oxime ester No. 17) per litre was added. The solution obtained was poured into a test tube of boro-silicate glass, from which the oxygen had been expelled by a current of nitrogen. Then the tube was sealed.

The solution was irradiated for 120 min. by means of a mercury vapour lamp of 300 watt placed at 18 cm. After the irradiation the formed polymer was precipitated by pouring the solution into an excess of methanol, separated, and dried under reduced pressure. Depending on the monomer concentration the following yields of polymer were obtained:

| Mole of monomer per litre: | Yield in mg. |
|---|---|
| 2.34 | 300 |
| 3.74 | 762 |
| 4.68 | 1,101 |
| 5.62 | 1,424 |
| 7.02 | 1,908 |
| 8.42 | 2,238 |

EXAMPLE 2

Example 1 was repeated but a determined amount of methyl methacrylate was dissolved in benzene, viz 4.68 moles/litre, whereas the amount of initiator varied. After an irradiation for 120 min. the following yields of polymer were obtained:

| $10^{-3}$ mole of initiator per litre: | Yield in mg. |
|---|---|
| 0.5 | 740 |
| 1 | 1,101 |
| 1.5 | 1,373 |
| 5 | 2,236 |
| 10 | 3,060 |
| 50 | 6,431 |

EXAMPLE 3

The method of Example 1 was applied to five samples of solutions but as initiator different oxime esters were taken in a concentration of $10^{-3}$ mole/litre of solution. The concentration of methyl methacrylate amounted to 4.68 moles/litre. The following results were obtained after an irradiation time of 120 min.:

| No. of oxime ester used as initiator: | Yield of polymer in mg. |
|---|---|
| 2 | 1,224 |
| 6 | 1,368 |
| 11 | 1,039 |
| 21 | 952 |
| 32 | 1,922 |

EXAMPLE 4

Example 1 was repeated but instead of methyl methacrylate 16 ccs. of styrene were dissolved in 4 ccs. of benzene together with 21 mg. of 1-phenyl-1,2-propanedione-2-0-benzoyloxime (oxime ester No. 17, $5.10^{-3}$ mole/litre of solution). Depending on the irradiation time the following results were obtained.

| Time of irradiation in min.: | Yield of polymer in mg. |
|---|---|
| 60 | 691 |
| 120 | 974 |
| 180 | 1,084 |
| 240 | 1,181 |
| 300 | 1,282 |

EXAMPLE 5

Example 1 was repeated with 10 ccs. of acrylonitrile, 10 ccs. of benzene, and oxime ester No. 17 as initiator in a concentration of $10^{-3}$ mole/litre. After an irradiation time of 180 min. 2,910 mg. of polymer were obtained.

EXAMPLE 6

An amount of acrylamide was dissolved in a mixture of water and methyl glycol (40/60 parts by volume). The initiator used was the same as in Example 1 but in a concentration of $6.10^{-3}$ mole/litre. The mixture was then irradiated by means of a mercury vapour lamp of 180 watt placed at 18 cm. The photopolymerisation reaction was observed on 5 ccs. of solution. Depending on the concentration of acrylamide, the following results were obtained after 1 min. of irradiation after the period of inhibition:

| Mole of acrylamide/litre: | Yield of polymer in mg. |
|---|---|
| 1.76 | 124 |
| 2.11 | 150 |
| 2.46 | 203 |
| 2.82 | 233 |
| 3.17 | 304 |
| 3.52 | 345 |

EXAMPLE 7

An amount of acrylamide was dissolved in a mixture of water and methyl glycol (50/50) in a concentration 3.52 moles/litre (25%). As initiator 5.7 mg. of the oxime ester No. 25 was used, i.e. $7.77 \times 10^{-4}$ mole/litre. The circumstances of irradiation and reaction were the same as those of Example 6. The yield of polymer after 1 min. of irradiation after the inhibition period amounted to 156 mg., which corresponds to a yield of 12.5%.

EXAMPLE 8

A series of 27 samples was prepared by dissolving $10^{-5}$ mole of oxime ester in 5 ccs. of ethyleneglycol monomethyl ether and by adding to each of these solutions another solution of 3 g. of acrylamide in 5 ccs. of water. The mixtures obtained were irradiated with a mercury vapour lamp of 80 watt placed at a distance of 10 cm. Depending on the initiator used the following results were obtained.

| No. of oxime ester used as initiator | Time in min. after which— A discernable viscosity increase was observed | Gelification was obtained (90–95% yield) |
|---|---|---|
| 1 | 20 | 30 |
| 2 | 11 | 19 |
| 3 | 13 | 40 |
| 4 | 5 | 14 |
| 5 | 11 | 26 |
| 6 | 15 | 30 |
| 7 | 15 | 30 |
| 8 | 14 | 32 |
| 9 | 20 | 40 |
| 10 | 11 | 30 |
| 11 | 20 | 38 |
| 12 | 30 | 45 |
| 13 | 75 | 225 |
| 18 | 3 | 7 |
| 19 | 9 | 19 |
| 20 | 2 | 8 |
| 21 | 8 | 14 |
| 22 | 8 | 14 |
| 23 | 12 | 18 |
| 24 | 6 | 10 |
| 26 | 3 | 8 |
| 27 | 2 | 7 |
| 28 | 60 | 90 |
| 29 | 55 | 60 |
| 30 | 3 | 9 |
| 31 | 12 | 26 |
| 32 | 10 | 20 |

EXAMPLE 9

Diacetylmonoxime was reacted with methacrylic acid chloride and the 2,3-butanedione-O-methacrylyloxime obtained was copolymerised with methyl methacrylate such as described in Examples 3A and B of the British patent application No. 36,393/67 and relating to light-sensitive polymers. The copolymer was composed of recurring units having the formulae

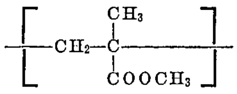

and

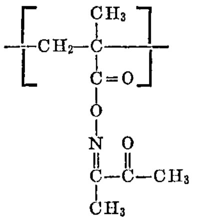

These recurring units are present in the copolymer in a proportion of 13 units of the first formula to one unit of the second formula.

5 ccs. of styrene and 1 g. of copolymer formed above were dissolved in benzene. The total volume of the solution viz 20 ccs., was poured into a reaction tube, whereafter the dissolved oxygen was expelled by a current of nitrogen. The tube was sealed and the solution was irradiated for 8 h. by means of a mercury vapour lamp of 300 watt placed at a distance of 18 cm.

By adding an excess of methanol 1.470 g. of polymer could be obtained. By means of a fractionated precipitation from a 1.4% solution in chloroform, the following fractions were separated:

| | | Gram |
|---|---|---|
| 0.31 | Polystyrene | |
| 0.6 | Graft copolymer I | 0.4232 |
| 0.75 | Graft copolymer II | 0.3384 |
| >0.75 | Original copolymer | 0.7084 |

In the first column the ratio of precipitating agent (methanol) to the total volume of solution is given. No homopolystyrene has thus been observed.

EXAMPLE 10

A solution of 1.3 g. of copolymer of Example 9 and 2 g. of acrylamide in 25 ccs. of dioxane was irradiated for 2 h. as in Example 9 but without preliminary expulsion of the oxygen. An amount of 2.38 g. of polymer could be separated as a precipitate. After an extraction of 24 h. by means of water, a soluble fraction having a nitrogen content of 14–16.7% and an insoluble fraction having a nitrogen content of 6.4–6.18% could be separated. Since the nitrogen content of polyacrylamide amounts to 21%, this pointed to a grafting of acrylamide onto the polymer carrying oxime groups.

EXAMPLE 11

Example 9 was repeated but 1 g. of copolymer and 5 ccs. of acrylonitrile were dissolved in 15 ccs. of benzene. After an irradiation time of 7 min. a viscous gel was obtained. Yield: 2.28 g. of graft polymer.

EXAMPLE 12

As in Example 9, 1 g. of copolymer and 5 ccs. of diethylamino ethyl methacrylate, dissolved in 15 ccs. of benzene were irradiatd for 2 h. By concentrating, dissolving in water containing hydrogen chloride, and precipitating in aqueous sodium hydroxide, 3.5 g. of polymer were obtained having a nitrogen content of 6.25–6.32%. Since pure polydiethylaminoethyl methacrylate possesses a nitrogen content of 7.57%, a considerable amount of diethylaminoethyl methacrylate seemed to have been grafted onto the polymer carrying oxime groups.

EXAMPLE 13

1-(p-hydroxyphenyl)-1,2-propanedione - 2 - oxime was prepared and polycondensed with isophthaloyl chloride, terephthaloyl chloride and 2,2-bis(4-hydroxyphenyl)-propane such as described in Example 1 of the British patent application No. 36,393/67. The copolyester was composed of equal amounts of recurring units of the following formulae:

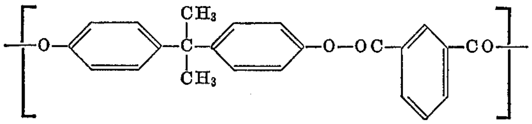

(I)

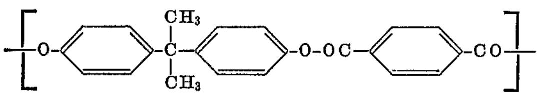

(II)

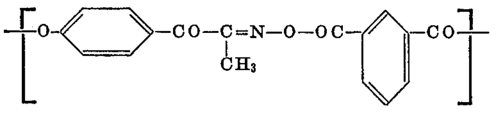

(III)

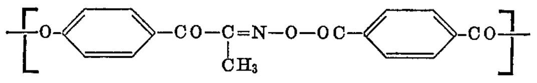

(IV)

800 mg. of the above copolyester and 4 ccs. of methyl methacrylate free from any inhibitor were dissolved in 16 ccs. of dichloromethane. The solution obtained is poured into a test tube of boro-silicate glass; the oxygen is then eliminated by a nitrogen current. The reaction tube was sealed and irradiated for 6 hours by means of a mercury vapour lamp of 300 watt placed at 18 cm. Thereupon the formed polymer was precipitated by pouring the solution into methanol. Yield: 1.9 g.

A fractionated precipitation showed that the methyl methacrylate had formed a block copolymer with the original copolyester.

The 1-(p-hydroxyphenyl) - 1,2 - propandione-2-oxime could also be polycondensed in the way described above with a mixture of isophthaloyl chloride and terephthaloyl chloride in the absence of 2,2-bis(4-hydroxyphenyl)-propane. In that case the formed polycondensate consisted of recurring units of the Formulae III and IV above.

EXAMPLE 14 p-hydroxyphenylglyoxaloxime was prepared and polycondensed with isophthaloyl chloride and terephthaloyl chloride such as described in Example 2 of the British patent application No. 36,393/67. A polycondensate was obtained composed of equal amounts of recurring units of the formulae:

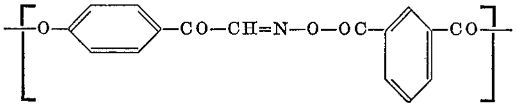

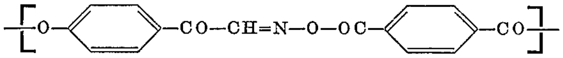

This polyester as well as that of Example 13 could be used with ethylenically unsaturated compounds and form block copolymers by irradiation.

EXAMPLE 15

A mixture of 10 g. copoly(ethylene/maleic anhydride), 5 ccs. of triethylene glycol diacrylate, 25 mg. of 2,6-ditert, butyl-p-cresol, 50 ccs. of acetone and 100 mg. of the oxime ester No. 17 were stirred until a solution was obtained. By means of this solution a glass plate was covered in such a way that a layer was formed which after being dried was about 0.3 mm. thick. This layer was irradiated for 5 min. through a line negative by means of a mercury vapour lamp of 80 watt placed at a distance of 15 cm.

Thereafter the exposed areas were washed away with acetone. A very sharp relief image was obtained.

We claim:

1. Process for the photopolymerisation of ethylenically unsaturated organic compounds, which comprises irradiating with light of wavelengths ranging from 2500 to 4000 Angstroms a composition comprising a photopolymerisable ethylenically unsaturated organic compound and a compound containing at least one oxime ester group as a photopolymerisation initiator.

2. Process according to claim 1, wherein the compound containing oxime ester groups corresponds to one of the following formulae:

$$R_2-\overset{R_1}{\overset{|}{C}}=N-O-R_3 \quad \text{or} \quad R_2-\overset{R_1}{\overset{|}{C}}=N-O-R_4-O-N=\overset{R_1}{\overset{|}{C}}-R_2$$

wherein:

$R_1$ represents an alkyl group comprising 1 or 2 carbon atoms, an aryl group, and alkaryl group, an aralkyl group, a hydroxy-substituted aralkyl group, or an acyl group, $R_2$ represents a hydrogen atom, an alkyl group comprising 1 or 2 carbon atoms, an aryl group or an acyl group, or wherein $R_1$ and $R_2$ together represent the necessary atoms to form with the carbon atom acycloalkyl group, a phenanthrone group or an indanone group, $R_3$ represents an acyl group, and $R_4$ represents a diacyl radical.

3. Process according to claim 1, wherein the compound containing an oxime ester group has the formula:

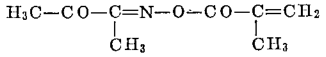

4. Process according to claim 1, wherein the compound containing an oxime ester group has the formula:

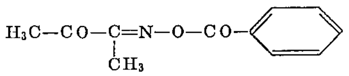

5. Process according to claim 1, wherein the compound containing an oxime ester group has the formula:

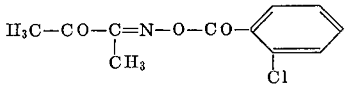

6. Process according to claim 1, wherein the compound containing an oxime ester group has the formula:

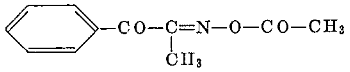

7. Process according to claim 1, wherein the compound containing an oxime ester group has the formula:

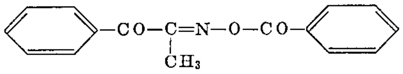

8. Process according to claim 1, wherein the compound containing an oxime ester group has the formula:

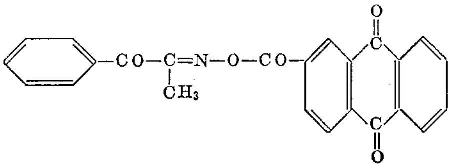

9. Process according to claim 1, wherein the compound containing an oxime ester group has the formula:

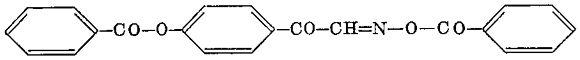

10. Process according to claim 1, wherein the compound containing an oxime ester group has the formula:

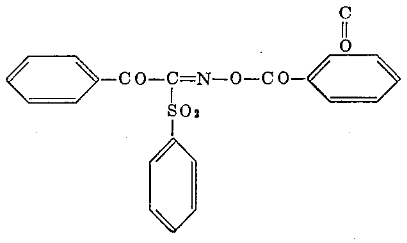

11. Process according to claim 1, wherein the compound containing oxime ester groups has the formula:

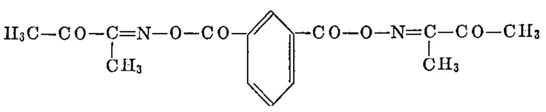

12. Process according to claim 1, wherein the compound containing oxime ester groups is a polymer carrying side-substitutents comprising an oxime ester group.

13. Process according to claim 12, wherein the polymer carrying side-substituents comprising an oxime ester group is a copolymer of methyl methacrylate and 2,3-butanedione-O-methacrylyloxime.

14. Process according to claim 1, wherein the compound containing oxime ester groups is a polymer comprising oxime ester groups constituting integral parts of the polymer chains.

15. Process according to claim 14, wherein the polymer comprising oxime ester groups and constituting integral parts of the polymer chains is the polycondensation product of p-hydroxyphenyl - 1,2 - propanedione-2-oxime, 2,2-bis(4-hydroxyphenyl)-propane, terephthalic acid and isophthalic acid.

16. Process according to claim 14, wherein the polymer comprising oxime ester groups and constituting integral parts of the polymer chains is the polycondensation produce of p-hydroxyphenylglyoxaloxime, terephthalic acid and isophthalic acid.

17. A process for the production of a polymeric photographic relief image, which comprises irradiating to light of wavelengths ranging from 2500 to 4000 Angstroms through a master pattern a photographic element comprising a support having thereon a light-sensitive layer comprising at least one photopolymerisable ethylenically unsaturated organic compound and as a photopolymerisation initiator a compound containing oxime ester groups, whereby in the exposed areas said ethylenically unsaturated organic compound is polymerised, and removing the layer in the non-exposed areas by washing with a solvent for said ethylenically unsaturated organic compound.

18. A photopolymerisable element comprising a support and superposed thereon a light-sensitive layer comprising at least one photopolymerisable ethylenically unsaturated organic compound and as photopolymerisation initiator a compound containing an oxime ester group.

References Cited

UNITED STATES PATENTS

| | | | |
|---|---|---|---|
| 3,074,869 | 1/1963 | Workman | 96—35.1X |
| 3,203,802 | 8/1965 | Burg | 96—115X |
| 3,279,919 | 10/1966 | Laridon et al. | 96—35.1 |
| 3,342,593 | 9/1967 | Burg | 96—35.1X |

FOREIGN PATENTS

| | | | |
|---|---|---|---|
| 1,099,166 | 2/1961 | Germany | 96—115 |

RONALD H. SMITH, Primary Examiner

U.S. Cl. X.R.

96—115; 204—159.15, 159.23